United States Patent
Yoon (10) Patent No.: US 12,111,732 B1
(45) Date of Patent: Oct. 8, 2024

(54) METHOD AND SYSTEM FOR RECOVERING DATA ASSOCIATED WITH ARTIFICIAL INTELLIGENCE CALCULATION

(71) Applicant: REBELLIONS INC., Seongnam-si (KR)

(72) Inventor: Seokju Yoon, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/638,482

(22) Filed: Apr. 17, 2024

(30) Foreign Application Priority Data

Aug. 11, 2023 (KR) .................. 10-2023-0105463

(51) Int. Cl.
G06F 11/00 (2006.01)
G06F 11/07 (2006.01)
G06F 11/14 (2006.01)

(52) U.S. Cl.
CPC ...... G06F 11/1415 (2013.01); G06F 11/0736 (2013.01); G06F 11/076 (2013.01)

(58) Field of Classification Search
CPC . G06F 11/1415; G06F 11/0736; G06F 11/076
See application file for complete search history.

(56) References Cited

U.S. PATENT DOCUMENTS

| | | | | |
|---|---|---|---|---|
| 7,464,293 B2 * | 12/2008 | Goyal | ............... | G06F 11/1482 714/15 |
| 10,282,103 B1 * | 5/2019 | Stone | ............... | G06F 13/24 |
| 2007/0214457 A1 * | 9/2007 | Goyal | ............... | G06F 16/1774 718/101 |
| 2014/0380094 A1 * | 12/2014 | Kota | ............... | G06F 9/3863 714/15 |
| 2019/0079817 A1 * | 3/2019 | Tomlin | ............... | G06F 11/0736 |
| 2022/0035762 A1 | 2/2022 | Zhang et al. | | |

FOREIGN PATENT DOCUMENTS

| KR | 10-2019-0134982 A | 12/2019 |
|---|---|---|
| KR | 10-2020-0138411 A | 12/2020 |
| KR | 10-2021-0002743 A | 1/2021 |
| KR | 10-2516412 B1 | 3/2023 |

\* cited by examiner

*Primary Examiner* — Amine Riad
(74) *Attorney, Agent, or Firm* — BROADVIEW IP LAW, PC (57) ABSTRACT

Provided is a method for recovering data for artificial intelligence calculation, which is performed by one or more processors and which includes extracting, from a command queue, a descriptor associated with a target job, that is a job to be executed, of a plurality of jobs, executing at least one command associated with the extracted descriptor to execute artificial intelligence calculation associated with the target job, resetting the command queue if an error occurs while executing the artificial intelligence calculation, determining at least one descriptor to be recovered, based on tracking data associated with at least one job, and recovering the determined at least one descriptor to the reset command queue.

20 Claims, 9 Drawing Sheets

METHOD AND SYSTEM FOR RECOVERING DATA ASSOCIATED WITH ARTIFICIAL INTELLIGENCE CALCULATION

CROSS-REFERENCE TO RELATED APPLICATION

This application claims priority to Korean Patent Application No. 10-2023-0105463, filed in the Korean Intellectual Property Office on Aug. 11, 2023, the entire contents of which are hereby incorporated by reference.

TECHNICAL FIELD

The present disclosure relates to a method for recovering data associated with artificial intelligence calculation, and more specifically, to a method and a system for recovering related data when an error occurs while executing artificial intelligence calculation.

BACKGROUND

Hardware specialized for artificial intelligence calculation is used to perform the artificial intelligence calculation. For example, hardware including Graphic Processing Unit (GPU), Neural Processing Unit (NPU), etc. is used to perform artificial intelligence calculation faster. Data for the artificial intelligence calculation is transmitted to the hardware, and the hardware applies the received data to a machine learning model to provide the result of the artificial intelligence calculation (e.g., inference result).

Meanwhile, due to various causes such as errors in the input data applied to the machine learning model, errors in systems or chips, errors may occur during artificial intelligence calculation, causing artificial intelligence calculation to fail. In preparation for the failure of the artificial intelligence calculation, the system is designed to partition hardware resources and perform each job independently through the partitioned hardware resources. For example, the system may be designed so that cache, random access memory (RAM), sys pipe, etc. may be separated in advance and independent jobs may be used through the separated hardware resources. In this case, each partitioned hardware resource performs artificial intelligence calculation jobs independent of each other, so that even if an error occurs in a specific job, other jobs are not affected, thereby meeting fault tolerance requirement.

However, partitioning the hardware resources is expensive to design and also requires much hardware resources. Accordingly, there is a need for technology that can meet the fault tolerance requirement at a low cost.

SUMMARY

In order to address one or more problems (e.g., the problems described above and/or other problems not explicitly described herein), the present disclosure provides a method, a non-transitory computer-readable recording medium, and an apparatus (system) for recovering data associated with artificial intelligence calculation.

The present disclosure may be implemented in a variety of ways, including methods, apparatus (systems) and/or non-transitory computer readable storage media storing instructions.

A method for recovering data for artificial intelligence calculation may be performed by one or more processors and include extracting, from a command queue, a descriptor associated with a target job, that is a job to be executed, of a plurality of jobs, executing at least one command associated with the extracted descriptor to execute artificial intelligence calculation associated with the target job, resetting the command queue if an error occurs while executing the artificial intelligence calculation, determining at least one descriptor to be recovered, based on tracking data associated with at least one job, and recovering the determined at least one descriptor to the reset command queue.

In addition, the determining at least one descriptor to be recovered may include identifying a descriptor associated with the error, and determining at least one descriptor subsequent to the identified descriptor to be a descriptor to be recovered.

In addition, the determining at least one descriptor to be recovered may include identifying a descriptor associated with the error, and determining the identified descriptor and at least one descriptor subsequent to the identified descriptor to be descriptors to be recovered.

In addition, the determining at least one descriptor to be recovered may include identifying a descriptor associated with the error, identifying a number of errors in the artificial intelligence calculation associated with the identified descriptor, and if the number of identified errors exceeds a threshold, determining at least one descriptor subsequent to the identified descriptor to be a descriptor to be recovered.

In addition, the recovering the determined at least one descriptor to the reset command queue may include obtaining, from the tracking data, at least one descriptor stored in the command queue before reset, and recovering the command queue based on the obtained at least one descriptor.

In addition, the recovering the determined at least one descriptor to the reset command queue may include identifying, based on the tracking data, at least one command buffer address associated with the command queue before reset, and recovering the command queue based on a command stored in the identified at least one command buffer address.

In addition, the method for recovering data may further include, prior to the resetting the command queue, identifying context associated with a job having the error, and controlling the command queue such that an additional descriptors associated with the identified context is not stored in the command queue.

In addition, the context may be associated with at least one of a specific user or a specific port.

In addition, the method for recovering data may further include, prior to the resetting the command queue, identifying context associated with a job having the error, and if an additional job occurs that is not associated with the identified context, storing a descriptor associated with the additional job in the command queue.

In addition, at least one job data associated with a specific context may be stored in the job queue, a descriptor stored in the command queue may be associated with specific job data stored in the job queue, and a command associated with a specific descriptor stored in the command queue may be stored in a command buffer.

In addition, the executed at least one instruction may be associated with inference performed in a neural processing device.

A computer program stored in a computer readable recording medium may be provided to execute the method for recovering data described above on a computer.

The computing system may include a command queue storing at least one descriptor, and one or more processors configured to manage the command queue, in which the one or more processors may be configured to extract, from the command queue, a descriptor associated with a target job, that is a job to be executed, of a plurality of jobs, execute at least one command associated with the extracted descriptor to execute artificial intelligence calculation associated with the target job, reset the command queue if an error occurs while executing the artificial intelligence calculation, determine at least one descriptor to be recovered, based on tracking data associated with at least one job, and recover the determined at least one descriptor to the reset command queue.

According to some aspects of the present disclosure, it is possible to meet fault tolerance requirement for errors without the need to partition hardware resources.

According to some aspects of the present disclosure, if an error occurs during artificial intelligence calculation, the command queue may be reset and the descriptor associated with the job may be recovered to the reset command queue. In addition, commands associated with artificial intelligence calculation may be executed based on the descriptor recovered to the command queue. Accordingly, the artificial intelligence calculation may be normally executed even if an error occurs.

According to some aspects of the present disclosure, based on the tracking data associated with the job, at least one descriptor to be recovered may be determined and the determined at least one descriptor may be recovered to the command queue. Accordingly, the descriptor causing the error may be prevented from being recovered to the command queue, and it is also ensured that the necessary descriptor is recovered to the command queue.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. Note, however, that even if descriptions of components are omitted, it is not intended that such components are not included in any example.

Advantages and features of the disclosed examples and methods of accomplishing the same will become apparent by referring to the examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory, or may be implemented as a circuit (circuitry). Terms such as "circuit (or circuitry)" may refer to a circuit in hardware, but may also refer to a circuit in software. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, such as a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

Before describing various examples of the present disclosure, terms used herein will be explained.

In the present disclosure, "machine learning model" may include any model that is used for inferring an answer to a given input. The machine learning model may include an artificial neural network model including an input layer, a plurality of hidden layers, and an output layer. Each layer may include a plurality of nodes. In addition, in the present disclosure, the machine learning model may refer to an artificial neural network model, and the artificial neural network model may refer to the machine learning model.

In the present disclosure, a "descriptor" may include at least one instruction address for executing the artificial intelligence calculation. The instruction address herein may be an address of a storage area (e.g., a buffer) in which the instruction is stored. In addition, the descriptor may be associated with at least one job. For example, performing a single job may mean that at least one instruction associated with the descriptor is executed.

Hereinafter, various examples of the present disclosure will be described in detail with reference to the accompanying drawings.

Figure 1:
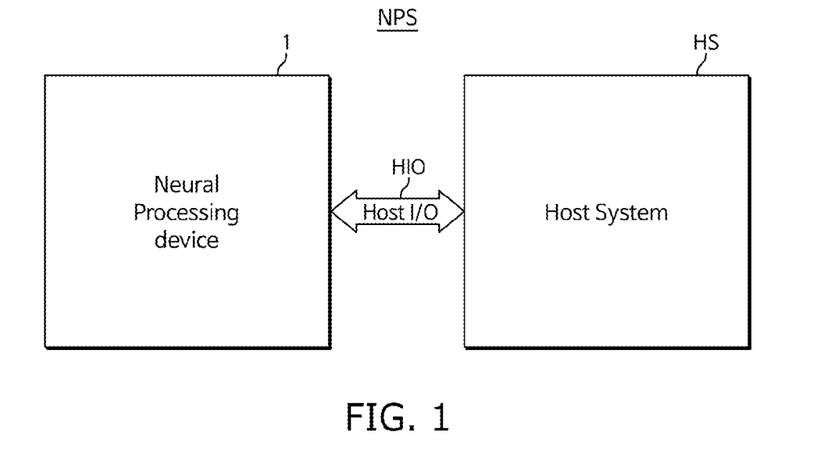
FIG. 1 is a block diagram provided to explain a neural processing system.

FIG. 1 is a block diagram provided to explain a neural processing system (NPS). Referring to FIG. 1, a neural processing system (NPS) according to some examples of the present disclosure may include a neural processing device 1, a host system (HS), and a host interface (HIO).

The neural processing device 1 may be provided to perform calculation using an artificial neural network. For example, the neural processing device 1 may be a device specialized for performing deep learning calculation jobs. However, aspects are not limited to the above.

The neural processing device 1 may be a processing device other than a neural processing device. For example, the neural processing device 1 may be a graphics processing unit (GPU), a central processing unit (CPU), or other types of processing devices.

The host system (HS) may be a computing system that instructs the neural processing device 1 to perform calculation jobs and retrieves the results of the calculation jobs. For example, the host system (HS) may transmit data associated with the artificial intelligence calculation to the neural processing device 1, and receive, from the neural processing device 1, the result of the artificial intelligence calculation based on the transmitted data. Compared to the neural processing device 1, the host system (HS) may be a computing system that is not specialized for deep learning calculation jobs. However, aspects are not limited to the above.

The host interface (HIO) may transmit data and control signals between the neural processing device 1 and the host system (HS). For example, the host interface (HIO) may transmit commands and data of the host system (HS) to the neural processing device 1, and the neural processing device 1 may accordingly perform calculation jobs. Upon completing the calculation job, the neural processing device 1 may transmit the result to the host system (HS) through an interrupt request. For example, the host interface (HIO) may be PCI Express (PCIe), but is not limited thereto.

Figure 2:
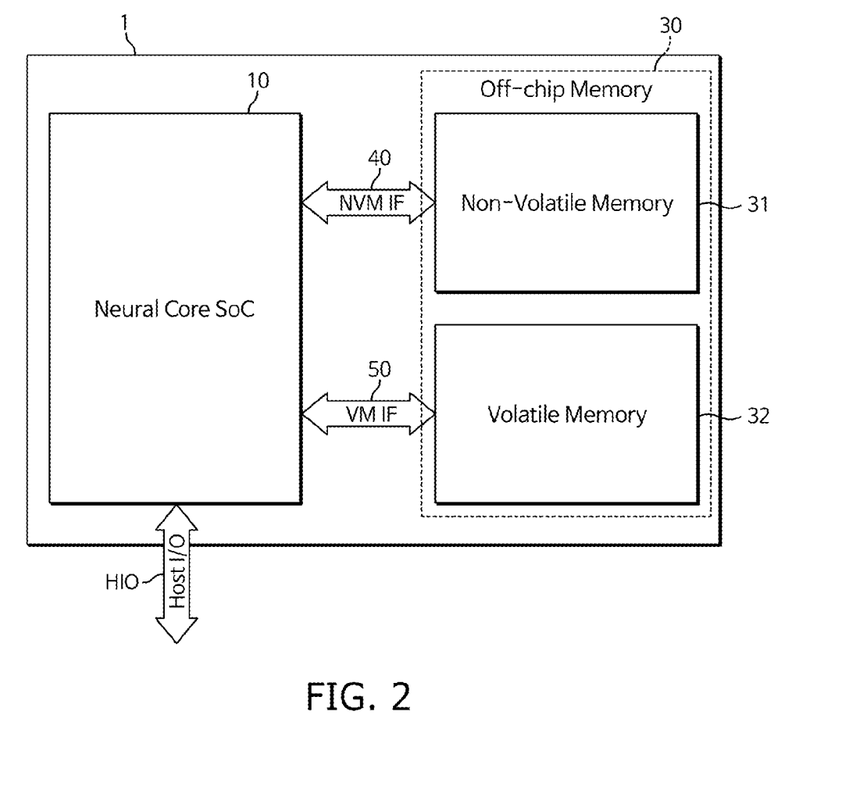
FIG. 2 is a block diagram provided to explain the neural processing device of FIG. 1 in detail.

FIG. 2 is a block diagram provided to explain the neural processing device of FIG. 1 in detail. Referring to FIG. 2, the neural processing device 1 may include a neural core SoC 10, an off-chip memory 30, a non-volatile memory interface 40, and a volatile memory interface 50.

The neural core SoC 10 may be a System on Chip device. The neural core SoC 10 may be artificial intelligence calculation unit and may include an accelerator. The neural core SoC 10 may include at least one of a graphics processing unit (GPU), a field programmable gate array (FPGA), and an application-specific integrated circuit (ASIC), for example. However, aspects are not limited to the above.

The neural core SoC 10 may exchange data with other external computing units through a separate external interface. In addition, the neural core SoC 10 may be connected to a non-volatile memory 31 and a volatile memory 32 through the non-volatile memory interface 40 and the volatile memory interface 50, respectively.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. The non-volatile memory 31 may store one or more instructions for controlling calculation of a machine learning model, which will be described below. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVEPROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, and 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, the non-volatile memory interface 40 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, the volatile memory interface 50 may be at least one of Single Data Rate (SDR), Double Data Rate (DDR), Quad Data Rate (QDR), eXtreme Data Rate (XDR), and Octal Data Rate. However, aspects are not limited to the above.

The neural core SoC 10 may include at least one processor, and the processor may receive data and/or commands from the host system via the host interface (HIO), apply the received data to the machine learning model, and perform artificial intelligence calculation. In addition, the neural core SoC 10 may transmit the result data for the artificial intelligence calculation to the host system through the host interface (HIO). When an error occurs while performing artificial intelligence calculation, the neural core SoC 10 may transmit a message associated with the occurrence of the error to the host system through the host interface (HIO).

Figure 3:
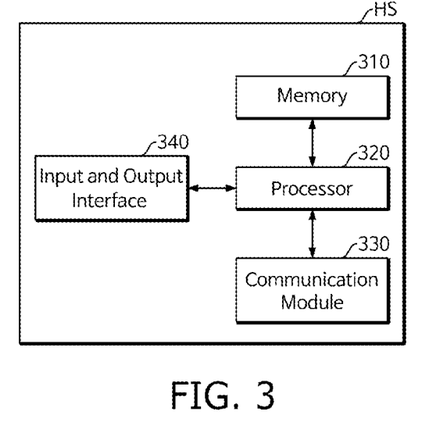
FIG. 3 is a block diagram provided to explain the host system of FIG. 1 in detail.

FIG. 3 is a block diagram provided to explain the host system (HS) of FIG. 1 in detail. The host system (HS) may include a memory 310, a processor 320, a communication module 330, and an input and output interface 340. As illustrated in FIG. 3, the host system (HS) may be configured to communicate information and/or data through a network by using the communication module 330.

The memory 310 may include any non-transitory computer-readable recording medium. The memory 310 may include a permanent mass storage device such as read only memory (ROM), disk drive, solid state drive (SSD), flash memory, and so on. As another example, a non-perishable mass storage device such as ROM, SSD, flash memory, disk drive, etc. may be included in the host system (HS) as a separate permanent storage device separate from the memory. In addition, the memory 310 may store an operating system and at least one program code (e.g., a code for requesting artificial intelligence calculation, recovering data, etc., which may be installed and running on the host system (HS)). At least one queue and/or buffer may be included in at least one of the memory 310 or the permanent storage device. Although the memory 310 is illustrated as a single memory in FIG. 3, this is only for convenience of description, and the memory 310 may include a plurality of memories. The queue and the buffer will be discussed below with reference to FIGS. 4 to 7.

Software components may be loaded from a computer-readable recording medium separate from the memory 310. Such a separate computer-readable recording medium may include a recording medium directly connectable to the host system (HS), and may include, for example, a computer-readable recording medium such as a floppy drive, a disk, a tape, a DVD/CD-ROM drive, a memory card, etc. In another example, the software components may be loaded into the memory 310 through the communication module 330 rather than the computer-readable recording medium. For example, at least one program may be loaded into the memory 310 based on a computer program (e.g., a program for requesting artificial intelligence calculation, recovering data, etc.) which may be installed by files provided by developers or a file distribution system that distributes application installation files through the communication module 330.

The processor 320 may be configured to process the commands of the computer program by performing basic arithmetic, logic, and input and output calculation. The commands may be provided to a user terminal (not illustrated) or another external system by the memory 310 or the communication module 330. For example, the processor 320 may receive data associated with a job from the user terminal via the communication module 330.

The communication module 330 may provide a configuration or function for the user terminal (not illustrated) and the host system (HS) to communicate with each other through a network, and may provide a configuration or function for the host system (HS) to communicate with an external system (e.g., a separate cloud system). For example, control signals, commands, data, etc. provided under the control of the processor 320 of the host system (HS) may be transmitted to the user terminal and/or the external system through the communication module 330 and the network through the communication module of the user terminal and/or the external system.

In addition, the input and output interface 340 of the host system (HS) may be connected to the host system (HS) or may be a means for interfacing with an apparatus (not illustrated) for inputting or outputting which may be included in the host system (HS). For example, the input and output interface 340 may include at least one of a PCI express interface and an Ethernet interface. The input and output interface 340 may include a host interface (HIO) formed between the host system (HS) and the neural core device. Data, commands, signals, messages, etc. may be transmitted or received through the host interface. The host system (HS) may include more components than those illustrated in FIG. 3.

The processor 320 of the host system (HS) may be configured to manage, process, and/or store the information and/or data received from a plurality of user terminals and/or a plurality of external systems. In addition, the processor 320 may be configured to manage at least one queue/buffer. In addition, the processor 320 may be further configured to recover a command queue which will be described below. The processor 320 may extract, from the command queue, a buffer descriptor associated with a target job, that is a job to be executed, of a plurality of jobs, execute at least one command associated with the extracted buffer descriptor, and execute artificial intelligence calculation associated with a target job. If an error occurs while executing artificial intelligence calculation, the processor 320 may reset a command queue and determine at least one buffer descriptor to be recovered, based on tracking data associated with at least one job. In addition, the processor 320 may recover the determined at least one buffer descriptor to the command queue.

Hereinafter, a method of the processor 320 for managing a plurality of queues and buffers and recovering the command queue in response to a calculation error will be described with reference to FIGS. 4 to 8. Management of a plurality of queues and buffers illustrated in FIGS. 4 to 8 to be described below may be performed by the processor 320. For example, the management of a plurality of queues and buffers illustrated in FIGS. 4 to 8 may be associated with the operation of a driver supported by the processor 320.

Figure 4:
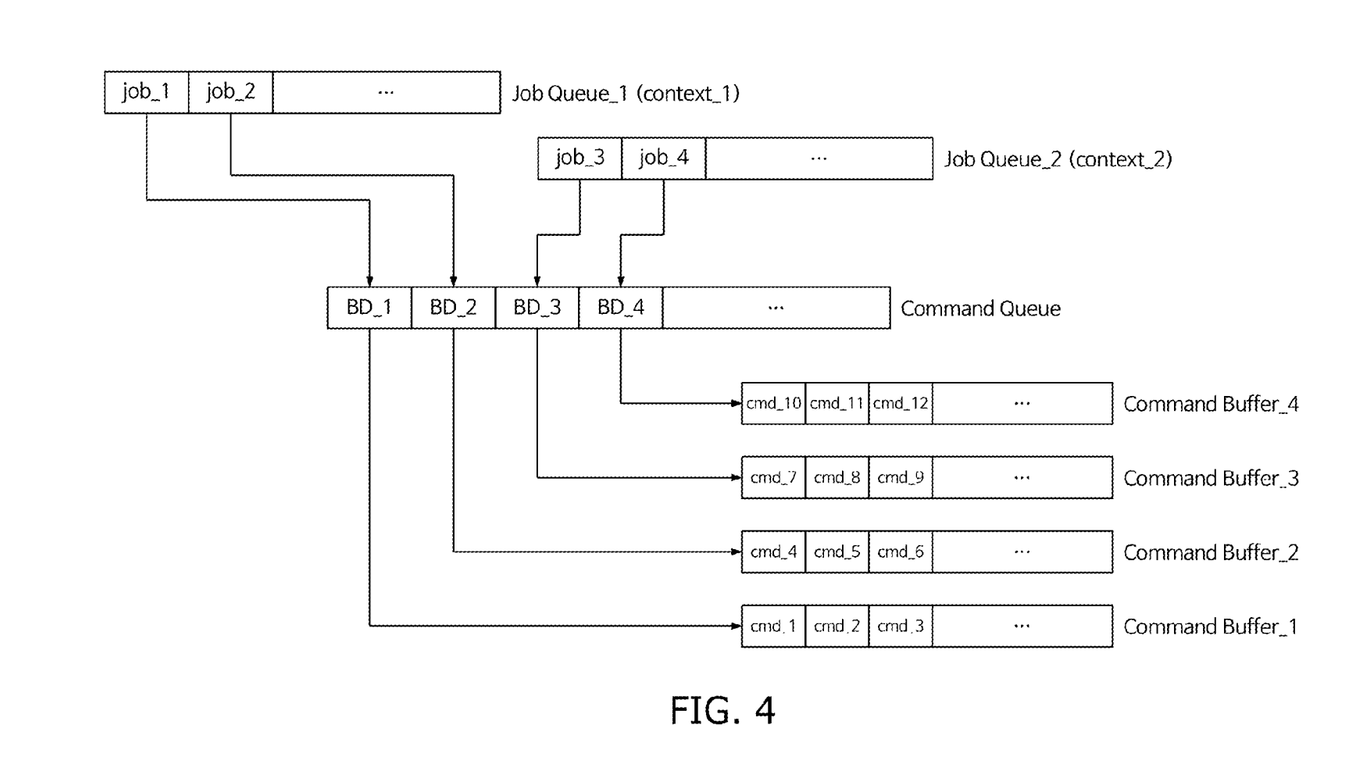
FIG. 4 is a diagram illustrating a plurality of queues and buffers used for performing artificial intelligence calculation.

FIG. 4 is a diagram illustrating a plurality of queues and buffers used for performing artificial intelligence calculation. As illustrated in FIG. 4, the host system may include a plurality of job queues (Job Queue_1, Job Queue_2), at least one command queue, and a plurality of command buffers. Each of the plurality of job queues (Job Queue_1, Job Queue_2), the command queue, and the plurality of command buffers may be managed by at least one processor included in the host system. Each of the plurality of buffers may have a logically or physically separated storage area. Likewise, each of the plurality of job queues may have a logically or physically separated storage area.

Job data may be stored in the job queues (Job Queue_1, Job Queue_2). The job data refers to data associated with the artificial intelligence calculation, and may be generated based on data and/or commands received from the user terminal. In addition, the job data may include at least one command. For example, the host system may receive a request for artificial intelligence calculation from the user terminal, generate job data based on the data and/or commands included in the request for artificial intelligence calculation, and store the job data in a job queue associated with the user terminal. In some aspects, the job data may be data for internal processing in the host system. For example, the job data may refer to data generated to store the data associated with the reception from the user terminal and the request for artificial intelligence calculation in the storage area of the host system.

The job queue may be associated with at least one context. The context is a set of program data, and one context identifier may be assigned to each user. That is, each user may be allocated with one job queue, and a context identifier may be allocated to the job queue. In some aspects, a virtual port identifier may be allocated to the job queue. That is, the virtual port identifier may be allocated to each job queue, and the context identifier may be allocated to a specific job queue having a unique port identifier.

If the job data is stored in the job queue, job data corresponding to the highest priority in the job queue may be extracted at a predetermined time point, and at least one command included in the job data may be stored in at least one command buffer.

If at least one command is stored in the command buffer, a buffer descriptor may be generated and stored in the command queue. The processor may generate a buffer descriptor including an address and size of at least one command stored in the command buffer, and store the generated buffer descriptor in the command queue. The buffer descriptor including the address of the buffer is illustrated as being stored in the command queue, but aspects are not limited thereto, and a descriptor including an address of a storage area other than the buffer may be stored in the command buffer. For convenience of description, it will be described below that the buffer descriptor is stored in the command queue.

A command associated with artificial intelligence calculation may be stored in each of the plurality of command buffers. For example, a command for transmitting data to a neural processing device or a command for obtaining result data, etc. may be stored in each of the plurality of command buffers. If a command associated with artificial intelligence calculation is executed, data applied to the machine learning model may be transmitted to the neural processing device.

Taking the buffer and queue illustrated in FIG. 4 as an example, a plurality of commands (cmd_1, cmd_2, and cmd_3) included in the first job data (job_1) may be stored in the first command buffer (Command Buffer_1), and a first buffer descriptor (BD_1) associated with the plurality of commands (cmd_1, cmd_2, and cmd_3) may be stored in the command queue. FIG. 4 illustrates that the first job queue (Job Queue_1) is associated with a first context (context_1). In addition, a plurality of commands (cmd_4, cmd_5, and cmd_6) included in the second job data (job_2) may be stored in the second command buffer (Command Buffer_2), and a second buffer descriptor (BD_2) associated with the plurality of commands (cmd_4, cmd_5, and cmd_6) may be stored in the command queue.

For example, taking the job data associated with the second context (context_2) as an example, a plurality of commands (cmd_7, cmd_8, and cmd_9) included in the third job data (job_3) may be stored in the third command buffer (Command Buffer_3), and a third buffer descriptor (BD_3) associated with the plurality of commands (cmd_7, cmd_8, and cmd_9) may be stored in the command queue. FIG. 4 illustrates that the second job queue (Job Queue_2) is associated with the second context (context_2). In addition, a plurality of commands (cmd_10, cmd_11, and cmd_12) included in the fourth job data (job_4) may be stored in the fourth command buffer (Command Buffer_4), and a fourth buffer descriptor (BD_4) associated with the plurality of commands (cmd_10, cmd_11, and cmd_12) may be stored in the command queue.

As illustrated in FIG. 4, a buffer descriptor may be stored in the command queue, and an actual command may be stored in the command buffer. In addition, the job data stored in the job queue may be generated based on the data received from the user terminal. For example, the job data stored in the first job queue (Job Queue_1) may be generated based on the data received from the first user terminal, and the job data stored in the second job queue (Job Queue_2) may be generated based on the data received from the second user terminal.

In this host system environment, when the command execution cycle arrives, the processor may obtain the highest priority buffer descriptor stored in the command queue and execute at least one command associated with the obtained buffer descriptor, thereby transmitting the data and/or commands for artificial intelligence calculation to the neural processing device. In this case, the neural processing device may apply the received data and/or commands to the machine learning model to perform artificial intelligence calculation and transmit the calculation result to the host system.

The processor included in the host system may manage the tracking data associated with the artificial intelligence calculation job. The tracking data may store at least one buffer descriptor and an order of buffer descriptors associated with commands that have yet to be executed. Additionally or alternatively, the tracking data may store the address of at least one command buffer associated with the buffer descriptor.

If the buffer descriptor is stored in the command queue, the buffer descriptor stored in the command queue may also be stored in the tracking data. According to some aspects, if the buffer descriptor is stored in the command queue, at least one command buffer address associated with the buffer descriptor may be stored in the tracking data. The address of the buffer descriptor and/or the command buffer stored in the tracking data may be stored in a first-in-first-out structure. That is, the buffer descriptor and/or the command address stored in the tracking data may be in sequence. If the artificial intelligence calculation result is received from the neural processing device, the address of the buffer descriptor or command buffer associated with the calculation result may be deleted from the tracking data.

Meanwhile, the neural processing device may fail to perform artificial intelligence calculation based on the data received from the host system. In this case, the neural processing device may transmit an error message to the host system.

Figure 5:
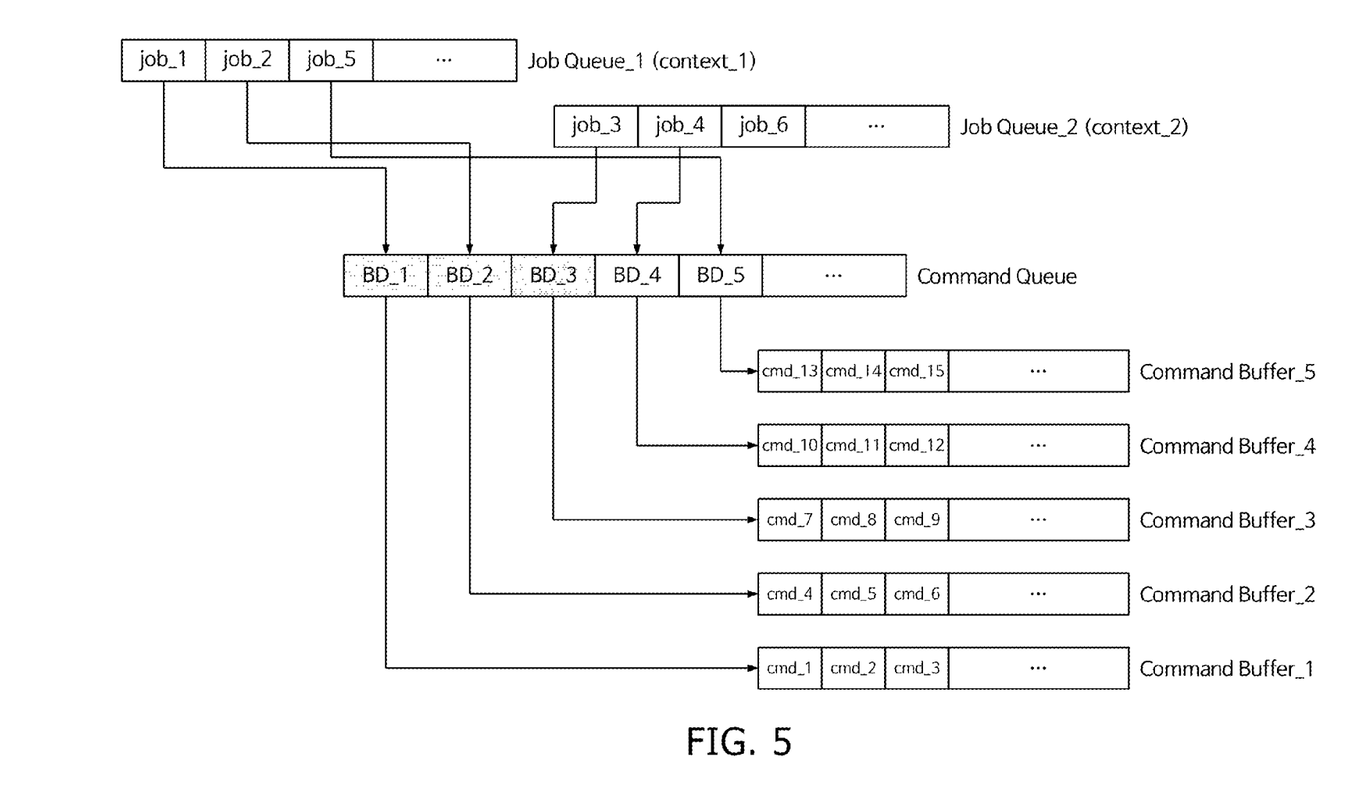
FIG. 5 is a diagram illustrating a failure of artificial intelligence calculation associated with a third job.

FIG. 5 is a diagram illustrating a failure of artificial intelligence calculation associated with a third job (job_3). Referring to FIG. 5, it is illustrated that the first job (job_1) and the second job (job_2) are normally performed, and an error occurs while the third job (job_3) is being performed. That is, at a time point when the third job (job_3) is started, the third buffer descriptor (BD_3) associated with the third job (job_3) may be extracted from the command queue, the address of the command buffer may be identified based on the extracted third buffer descriptor (BD_3), the seventh command (cmd_7), the eighth command (cmd_8), and the ninth command (cmd_9) corresponding to the identified address may be executed, and data and/or commands associated with the artificial intelligence calculation may be transmitted to the neural processing device. At least one of the seventh command (cmd_7), the eighth command (cmd_8), and the ninth command (cmd_9) may be associated with input data applied to the machine learning model.

The neural processing device may execute artificial intelligence calculation based on the data and/or commands received from the host system, and an error may occur while the artificial intelligence calculation is being executed. The artificial intelligence calculation may refer to a calculation associated with a graphic. For example, the artificial intelligence calculation may be a rendering calculation. In addition, rendering may be a result mainly based on pixel calculation. For example, rendering in the machine learning model (i.e., artificial intelligence calculation associated with rendering) may be a calculation result associated with at least one of weight data or multi-layer perceptron. When a graphics job is performed, even if a program, constant data, input data, etc. are included in one command buffer, overhead may not be generated significantly.

Meanwhile, since the machine learning model has a large program size according to constant data and multi-layers, when the constant data, multi-layers, etc. are extracted for each job, redundant and unnecessary time consumption may occur during artificial intelligence calculation (e.g., inference). Reducing this time may improve the performance of the entire neural processing system. A job queue may be allocated for each context, a command associated with a job stored in the job queue may be stored in a command buffer, and in addition, a buffer descriptor may be stored in the command queue. When an error occurs while executing a specific job in this system environment, at least one of job data stored in the job queue or commands stored in the command buffer may be used to recover the command queue. By the configuration and recovery process of the queue and buffer, the job associated with the artificial intelligence calculation may be quickly processed, and also the recovery may be quickly completed.

FIG. 5 illustrates that an error occurs while artificial intelligence calculation associated with at least one of the commands associated with the third buffer descriptor (BD_3), that is, the seventh command (cmd_7), the eighth command (cmd_8), or the ninth command (cmd_9) is being executed.

If an error occurs in this way, the processor included in the host system may reset the command queue and recover the command queue. Resetting the command queue may refer to deleting the data stored in the command queue. In some aspects, hardware resources other than the command queue may also be reset. For example, at least one hardware resource except for the hardware resource for recovery, such as the job queue, the command buffer, etc. may be reset.

The processor included in the host system may obtain at least one descriptor stored in the command queue before reset from the tracking data, and recover the reset command queue based on the at least one obtained descriptor. According to some aspects, the processor included in the host system may identify at least one command buffer address associated with the command queue before reset based on the tracking data, and recover the reset command queue based on a command stored in the identified at least one command buffer address. In this case, the processor included in the host system may generate a descriptor including the address and size of the command and store the generated descriptor in the command queue to recover the reset command queue.

Hereinafter, various aspects of recovering the command queue will be described with reference to FIGS. 6 and 7.

After resetting the command queue, the processor included in the host system may recover the buffer descriptor based on the tracking data and store the recovered buffer descriptor in the command queue.

Figure 6:
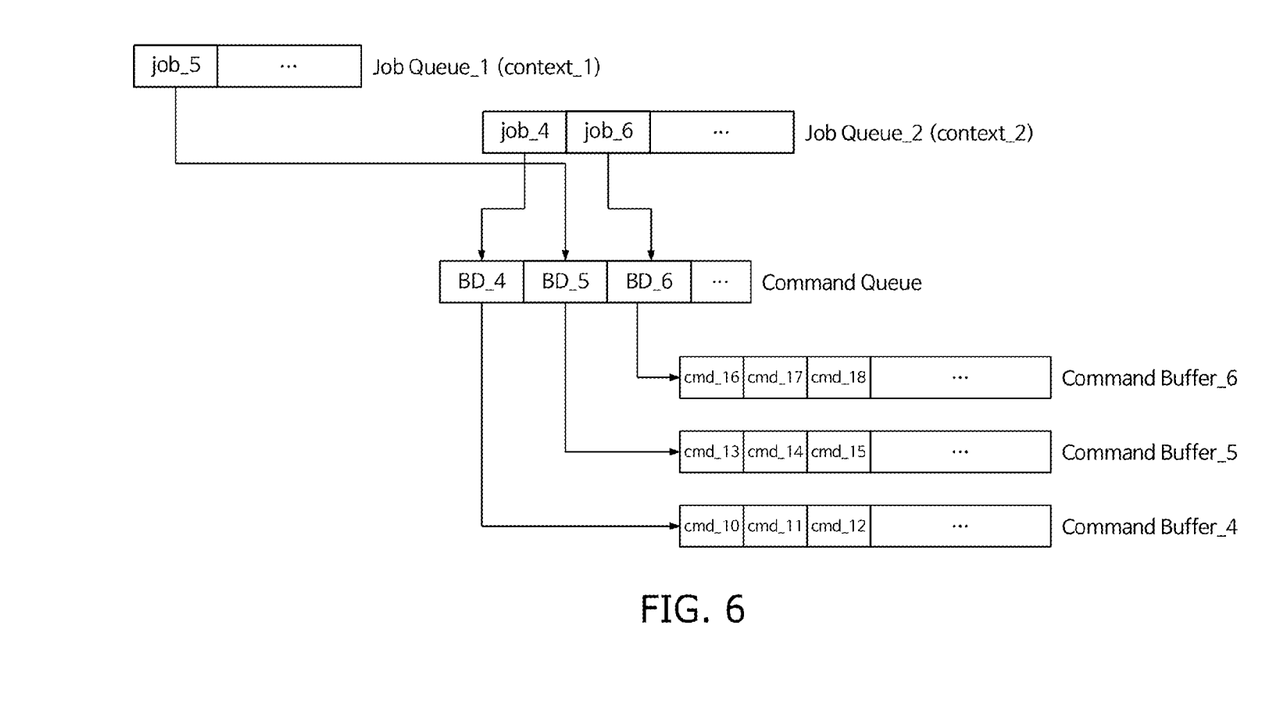
FIG. 6 is a diagram illustrating an example of recovering a command queue.

FIG. 6 is a diagram illustrating an example of recovering a command queue. Referring to FIG. 6, the processor included in the host system may reset the command queue in response to the occurrence of an error, and based on the tracking data, determine at least one buffer descriptor to be recovered. For example, a buffer descriptor subsequent to the third buffer descriptor (BD_3) having the error may be determined to be the buffer descriptor to be recovered. As another example, if the number of errors for the job associated with the third buffer descriptor (BD_3) associated with the error is counted and the counted number of errors exceeds a threshold, at least one buffer descriptor subsequent to the third buffer descriptor (BD_3) may be determined to be the buffer descriptor to be recovered. On the other hand, if the counted number of errors is less than or equal to the threshold, the third buffer descriptor (BD_3) and at least one buffer descriptor subsequent to the third buffer descriptor (BD_3) may be determined to be the buffer descriptors to be recovered. FIG. 6 illustrates that the fourth buffer descriptor (BD_4), the fifth buffer descriptor (BD_5), and the sixth buffer descriptor (BD_6) are recovered to the command queue.

Meanwhile, if an error occurs during the execution of the third job (job_3) associated with the third buffer descriptor (BD_3), and the third job_3 is associated with the first context (context_1), it may be controlled so that a new buffer descriptor associated with the first context (context_1) is not stored in the command queue until the command queue is reset and recovered. Accordingly, from a first time point at which the error occurs to a second time point at which the command queue is recovered, a new buffer descriptor associated with the first context (context_1) can be blocked from being stored in the command queue.

Alternatively, even before the command queue reset, a new buffer descriptor associated with the second context that is not associated with the first context having the error may be allowed to be stored in the command queue. That is, before the command queue is reset, a new buffer descriptor associated with the second context that is not associated with the error may be stored in the command queue. As illustrated in FIG. 6, a sixth buffer descriptor (BD_6), which is associated with the second context that is not related to the error and that is a new buffer descriptor, may be stored in the command queue.

Figure 7:
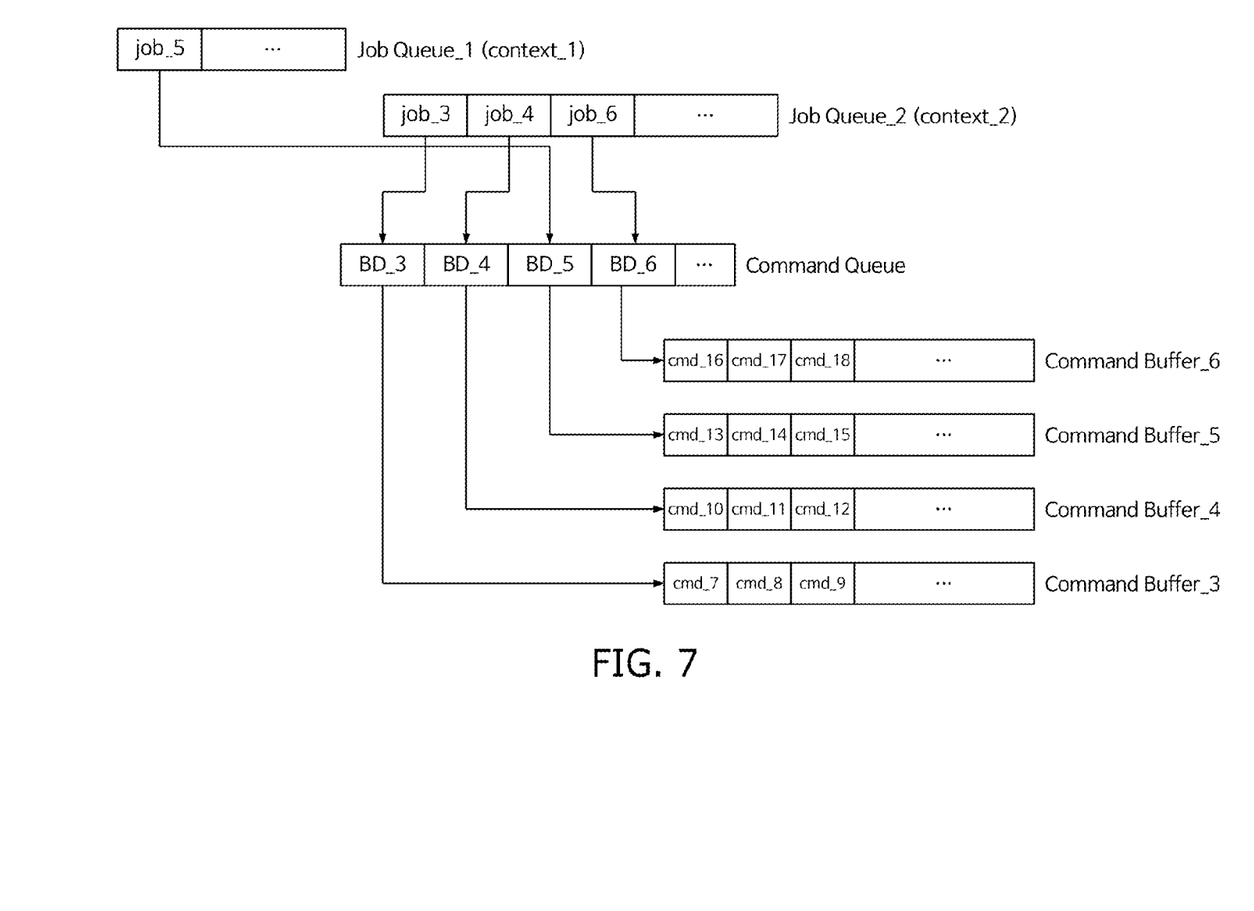
FIG. 7 is a diagram illustrating another example of recovering a command queue.

FIG. 7 is a diagram illustrating another example of recovering a command queue. Referring to FIG. 7, the processor included in the host system may reset the command queue in response to the occurrence of an error, and based on the tracking data, determine at least one buffer descriptor to be recovered. For example, the third buffer descriptor (BD_3) having the error and a buffer descriptor subsequent to the third buffer descriptor (BD_3) may be determined to be the buffer descriptors to be recovered. FIG. 6 illustrates that the third buffer descriptor (BD_3), the fourth buffer descriptor (BD_4), the fifth buffer descriptor (BD_5), and the sixth buffer descriptor (BD_6) are recovered to the command queue. Comparing FIG. 5 to FIG. 6, FIG. 6 illustrates that the third descriptor (BD_3) having the error is also recovered. According to some aspects, if the number of errors for the job associated with the third buffer descriptor (BD_3) is counted and the counted number of errors is less than or equal to a threshold, the third buffer descriptor (BD_3) may be determined to be the buffer descriptor to be recovered, and the fourth buffer descriptor (BD_4), the fifth buffer descriptor (BD_5), and the sixth buffer descriptor (BD_6) subsequent to the third buffer descriptor (BD_3) may also be determined to be the buffer descriptors to be recovered.

Figure 8:
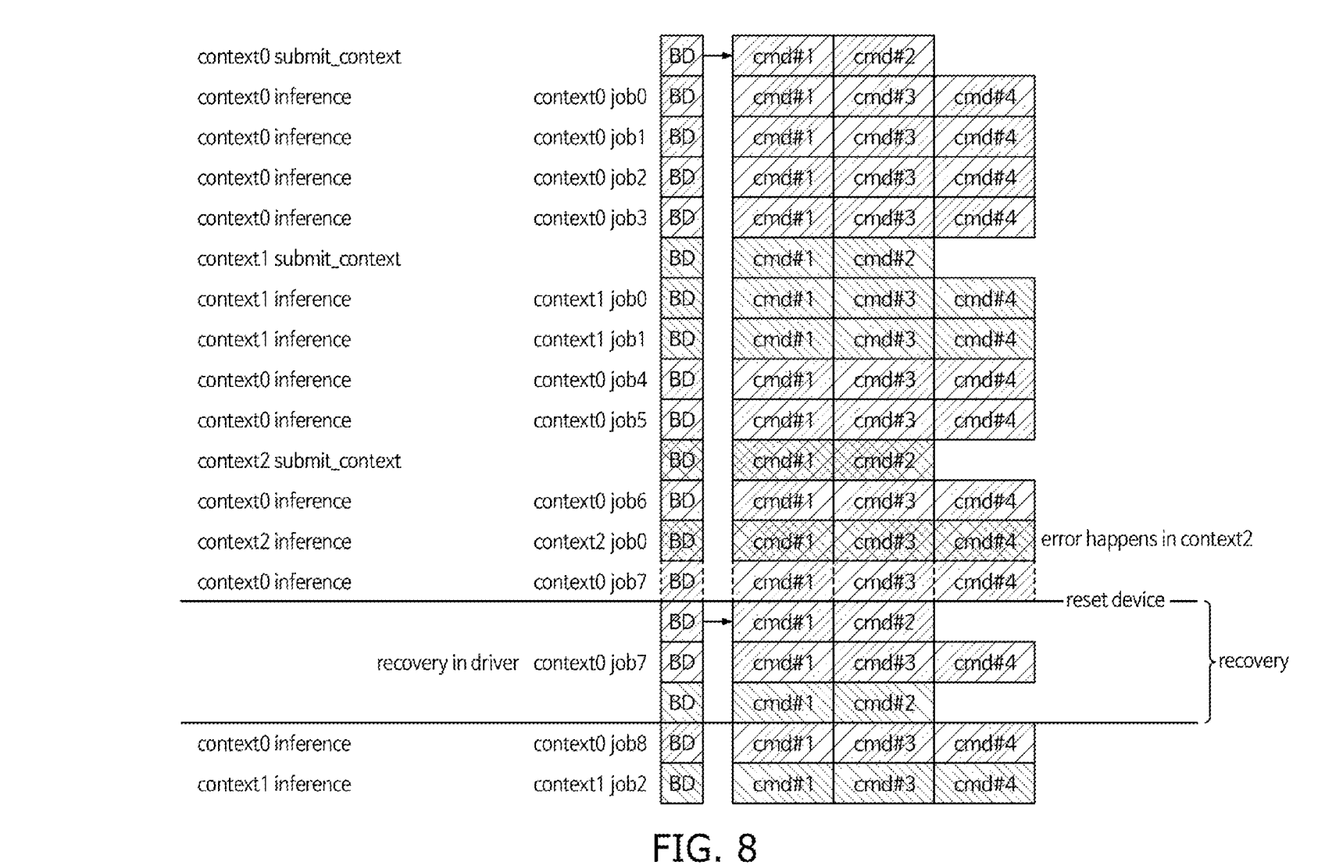
FIG. 8 is a diagram illustrating an example in which a command queue is recovered and artificial intelligence calculation is performed.

FIG. 8 is a diagram illustrating an example in which a command queue is recovered and artificial intelligence calculation is performed. In FIG. 8, "inference" shown in the leftmost column may refer to the artificial intelligence calculation job. In addition, "submit_context" may be related to receiving request for artificial intelligence calculation from a user terminal.

As illustrated in FIG. 8, after "submit_context" occurs, at least one job for artificial intelligence calculation (e.g., inference calculation) may be generated, and a buffer descriptor associated with the job may be stored in the command buffer. In FIG. 8, a command (cmd) disposed in the same line as the buffer descriptor (BD) may be a command associated with the buffer descriptor.

As illustrated in FIG. 8, an error may occur while "job0" associated with context2 is being performed. In this case, the buffer descriptor associated with context2 may be blocked from being stored in the command queue until the command queue is reset and recovered. Alternatively, until the command queue is reset, a buffer descriptor associated with a context other than context2 may be allowed to be stored in the command queue.

As illustrated in FIG. 8, an error has occurred in the context2, but a buffer descriptor (BD) associated with job7 of context0 may be stored in the command queue before the command queue is reset. If the command queue is reset, the buffer descriptor associated with job7 of context0 is recovered to the command queue, and the command associated with job7 of context0 is executed, as illustrated in FIG. 8. In FIG. 8, the reset of the command queue is expressed as "reset device", and the recovered buffer descriptors are expressed in the "recovery" section. That is, FIG. 8 illustrates that the descriptors subsequent to the descriptor associated with job0 of conext2 having the error are recovered to the command queue.

Figure 9:
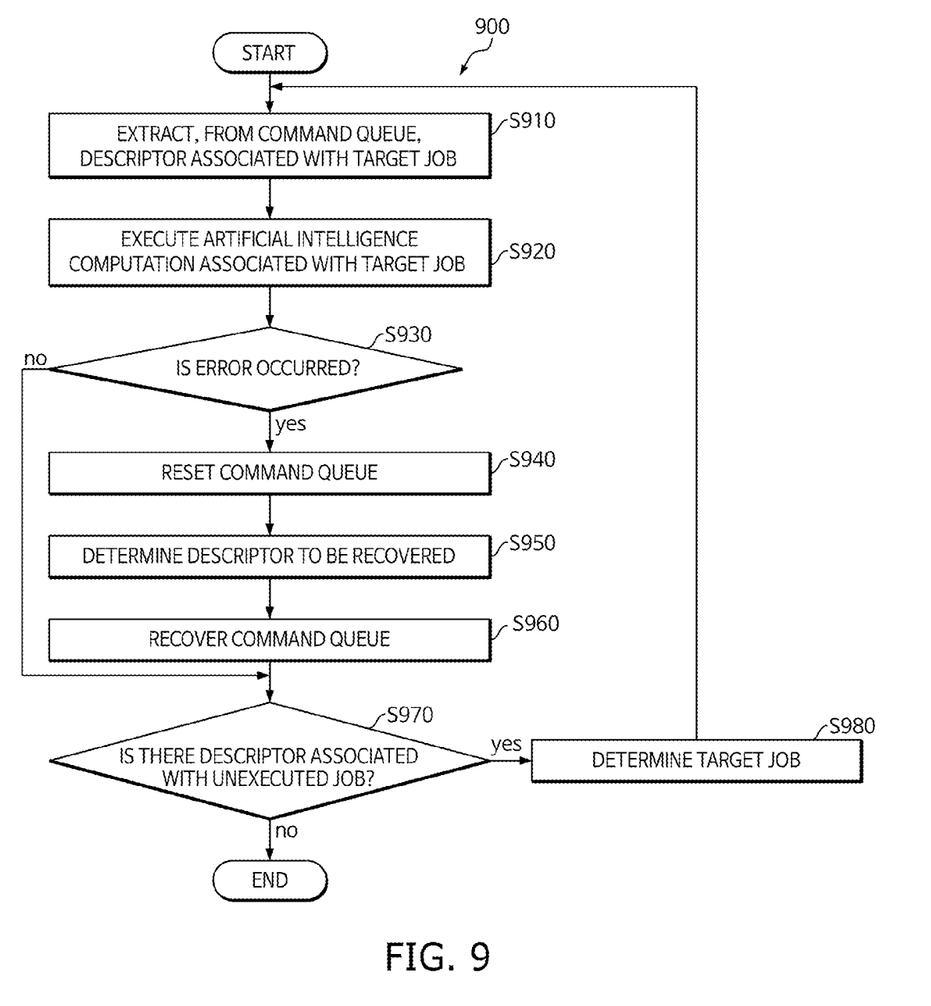
FIG. 9 is a flowchart provided to explain a method for recovering data for artificial intelligence calculation.

FIG. 9 is a flowchart provided to explain a method 900 for recovering data for artificial intelligence calculation. The method 900 illustrated in FIG. 9 is merely one example for achieving the object of the present disclosure, and it goes without saying that certain steps of operation may be added or deleted as needed. In addition, the method 900 illustrated in FIG. 9 may be performed by one or more processors included in the host system. For convenience of explanation, it will be described that each step of operation illustrated in FIG. 9 is performed by the processor included in the host system illustrated in FIG. 3. The method 900 according to FIG. 9 may be initiated if the descriptor is stored in the command queue.

The processor may extract, from the command queue, a descriptor associated with a target job, that is a job to be executed, of a plurality of jobs, at S910. The target job is a job to be executed in the current cycle, and the descriptor associated with this job may be stored in the command queue in advance.

The processor may execute at least one command associated with the extracted descriptor to execute artificial intelligence calculation associated with the target job, at S920. According to this configuration, at least one executed command may be associated with inference performed in the neural processing device. In addition, by executing at least one command, data and/or commands for artificial intelligence calculation may be transmitted to the neural processing device.

The processor may determine whether or not an error occurs while executing the artificial intelligence calculation, at S930. If the calculation result is received from the neural processing device, the processor may determine that the artificial intelligence calculation is normally executed without an error. On the other hand, if an error message is received from the neural processing device, the processor may determine that the error occurred while executing the artificial intelligence calculation.

If it is determined that an error occurs while executing the artificial intelligence calculation, the processor may reset the command queue, at S940. The processor may identify the context associated with the job having the error and control the command queue such that no additional descriptor associated with the identified context is stored in the command queue before resetting the command queue. In addition, the processor may identify the context associated with the job having the error, and if an additional job not associated with the identified context occurs, store the descriptor associated with the additional job in the command queue before resetting the command queue. The context may be associated with at least one of a specific user or a specific port.

The processor may determine at least one descriptor to be recovered, based on the tracking data associated with the at least one job, at S950. For example, the processor may identify a descriptor associated with the error and determine at least one descriptor subsequent to the identified descriptor to be the descriptor to be recovered. As another example, the processor may identify a descriptor associated with the error, and determine the identified descriptor and at least one descriptor subsequent to the identified descriptor to be the descriptors to be recovered. As another example, the processor may identify a descriptor associated with the error, identify the number of errors in the artificial intelligence calculation associated with the identified descriptor, and if the number of identified errors exceeds a threshold, determine at least one descriptor subsequent to the identified descriptor to be the descriptor to be recovered.

The processor may recover the determined at least one descriptor to the command queue, at S960. For example, the processor may obtain, from the tracking data, at least one descriptor stored in the command queue before reset, and recover the command queue based on the at least one obtained descriptor.

As another example, the processor may identify at least one command buffer associated with the command queue before reset based on the tracking data, and recover the command queue based on a command stored in the at least one identified command buffer.

At least one job data associated with a specific context may be stored in the job queue, the descriptor stored in the command queue may be associated with the specific job data stored in the job queue, and the command associated with the specific descriptor stored in the command queue may be stored in the command buffer.

If the reset command queue is recovered or artificial intelligence calculation associated with the descriptor is normally performed, the processor may determine whether there is a descriptor associated with a job that has yet to be executed, at S970. That is, the processor may determine whether a descriptor associated with an unexecuted job is stored in the command queue.

If it is determined that there is a descriptor associated with an unexecuted job, the processor may determine a job associated with the subsequent descriptor to be the target job, at S980. The processor may again perform the operation at S910 for extracting a descriptor (i.e., a descriptor with highest priority) associated with the determined target job from the command queue.

On the other hand, if it is determined that there is no descriptor associated with the unexecuted job, the processor may switch to a standby mode and end the method according to FIG. 9. If a new descriptor is stored in the command queue, the processor may restart the method according to FIG. 9.

The flowchart and description described above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with commands stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The commands may be executable by one or more processors, and may cause the processor(s) to perform certain aspects of the functions described in the present disclosure.

If implemented in software, the techniques described above may be stored on a computer-readable medium as one or more commands or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of commands or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for recovering data for artificial intelligence calculation, the method being performed by one or more processors and comprising:
   extracting, from a command queue, a descriptor associated with a target job, that is a job to be executed, of a plurality of jobs;
   executing at least one command associated with the extracted descriptor to execute artificial intelligence calculation associated with the target job;
   resetting the command queue if an error occurs while executing the artificial intelligence calculation;
   determining at least one descriptor to be recovered, based on tracking data associated with at least one job; and
   recovering the determined at least one descriptor to the reset command queue.

2. The method according to claim 1, wherein the determining at least one descriptor to be recovered comprises:
   identifying a descriptor associated with the error; and
   determining at least one descriptor subsequent to the identified descriptor to be a descriptor to be recovered.

3. The method according to claim 1, wherein the determining at least one descriptor to be recovered comprises:
   identifying a descriptor associated with the error; and
   determining the identified descriptor and at least one descriptor subsequent to the identified descriptor to be descriptors to be recovered.

4. The method according to claim 1, wherein the determining at least one descriptor to be recovered comprises:
   identifying a descriptor associated with the error;
   identifying a number of errors in the artificial intelligence calculation associated with the identified descriptor; and
   if the number of identified errors exceeds a threshold, determining at least one descriptor subsequent to the identified descriptor to be a descriptor to be recovered.

5. The method according to claim 1, wherein the recovering the determined at least one descriptor to the reset command queue comprises:
   obtaining, from the tracking data, at least one descriptor stored in the command queue before reset; and
   recovering the command queue based on the obtained at least one descriptor.

6. The method according to claim 1, wherein the recovering the determined at least one descriptor to the reset command queue comprises:
   identifying, based on the tracking data, at least one command buffer address associated with the command queue before reset; and
   recovering the command queue based on a command stored in the identified at least one command buffer address.

7. The method according to claim 1, further comprising, prior to the resetting the command queue:
   identifying context associated with a job having the error; and
   controlling the command queue such that an additional descriptor associated with the identified context is not stored in the command queue.

8. The method according to claim 7, wherein the context is associated with at least one of a specific user or a specific port.

9. The method according to claim 1, further comprising, prior to the resetting the command queue:
   identifying context associated with a job having the error; and if an additional job occurs that is not associated with the identified context, storing a descriptor associated with the additional job in the command queue.

10. The method according to claim 1, wherein, at least one job data associated with a specific context is stored in a job queue,
a descriptor stored in the command queue is associated with specific job data stored in the job queue, and
a command associated with a specific descriptor stored in the command queue is stored in a command buffer.

11. The method according to claim 1, wherein the executed at least one command is associated with inference performed in a neural processing device.

12. A non-transitory computer-readable recording medium storing instructions that, when executed by one or more processors, cause performance of the method according to claim 1.

13. A computing system comprising:
a command queue storing at least one descriptor; and
one or more processors configured to manage the command queue,
wherein the one or more processors are further configured to:
extract, from the command queue, a descriptor associated with a target job, that is a job to be executed, of a plurality of jobs;
execute at least one command associated with the extracted descriptor to execute artificial intelligence calculation associated with the target job;
reset the command queue if an error occurs while executing the artificial intelligence calculation;
determine at least one descriptor to be recovered, based on tracking data associated with at least one job; and
recover the determined at least one descriptor to the reset command queue.

14. The computing system according to claim 13, wherein the determining at least one descriptor to be recovered comprises:
identifying a descriptor associated with the error; and
determining at least one descriptor subsequent to the identified descriptor to be a descriptor to be recovered.

15. The computing system according to claim 13, wherein the determining at least one descriptor to be recovered comprises:
identifying a descriptor associated with the error; and
determining the identified descriptor and at least one descriptor subsequent to the identified descriptor to be descriptors to be recovered.

16. The computing system according to claim 13, wherein the determining at least one descriptor to be recovered comprises:
identifying a descriptor associated with the error; and
identifying a number of errors in the artificial intelligence calculation associated with the identified descriptor; and
if the number of identified errors exceeds a threshold, determining at least one descriptor subsequent to the identified descriptor to be a descriptor to be recovered.

17. The computing system according to claim 13, wherein the recovering the determined at least one descriptor to the reset command queue comprises:
obtaining, from the tracking data, at least one descriptor stored in the command queue before reset; and
recovering the command queue based on the obtained at least one descriptor.

18. The computing system according to claim 13, wherein the recovering the determined at least one descriptor to the reset command queue comprises:
identifying, based on the tracking data, at least one command buffer address associated with the command queue before reset; and
recovering the command queue based on a command stored in the identified at least one command buffer address.

19. The computing system according to claim 13, wherein the one or more processors are further configured to:
before resetting the command queue, identify a context associated with a job having the error, and
control the command queue such that an additional descriptor associated with the identified context is not stored in the command queue.

20. The computing system according to claim 13, wherein the one or more processors are further configured to:
before resetting the command queue, identify a context associated with a job having the error, and
if an additional job occurs that is not associated with the identified context, store a descriptor associated with the additional job in the command queue.

* * * * *